INVENTOR
AUBREY H. SMITH

United States Patent Office 3,488,521
Patented Jan. 6, 1970

3,488,521
CONTROL FOR VARYING THE PHASE OF A TRIGGERING SIGNAL FOR A CONTROLLED RECTIFIER
Aubrey H. Smith, Kenosha, Wis., assignor to Eaton Yale & Towne Inc., Cleveland, Ohio, a corporation of Ohio
Original application June 6, 1966, Ser. No. 555,410, now Patent No. 3,402,335, dated Sept. 17, 1968, which is a continuation-in-part of application Ser. No. 525,236, Feb. 4, 1966. Divided and this application Jan. 27, 1967, Ser. No. 612,212
Int. Cl. H03k 17/28; H02p 7/06
U.S. Cl. 307—252
9 Claims

ABSTRACT OF THE DISCLOSURE

An apparatus for controlling the speed of a motor which may be employed in a hoist for raising or lowering a load. Power is supplied to the motor through a circuit which functions to control the conduction of a controlled rectifier such as an SCR or thyratron. The motor drives a tachometer or some other equivalent device for providing a feedback signal which is a function of the motor speed. A reference signal is also generated corresponding to the desired speed of the motor. The circuit operates to vary the conduction of the controlled rectifier as a function of the relative amplitudes of the feedback and reference signals. By varying the conduction of the controlled rectifiers, power to the motor is controlled or varied, thus maintaining a preselected motor speed as determined by the reference signal under variable load conditions.

---

Figure 1:
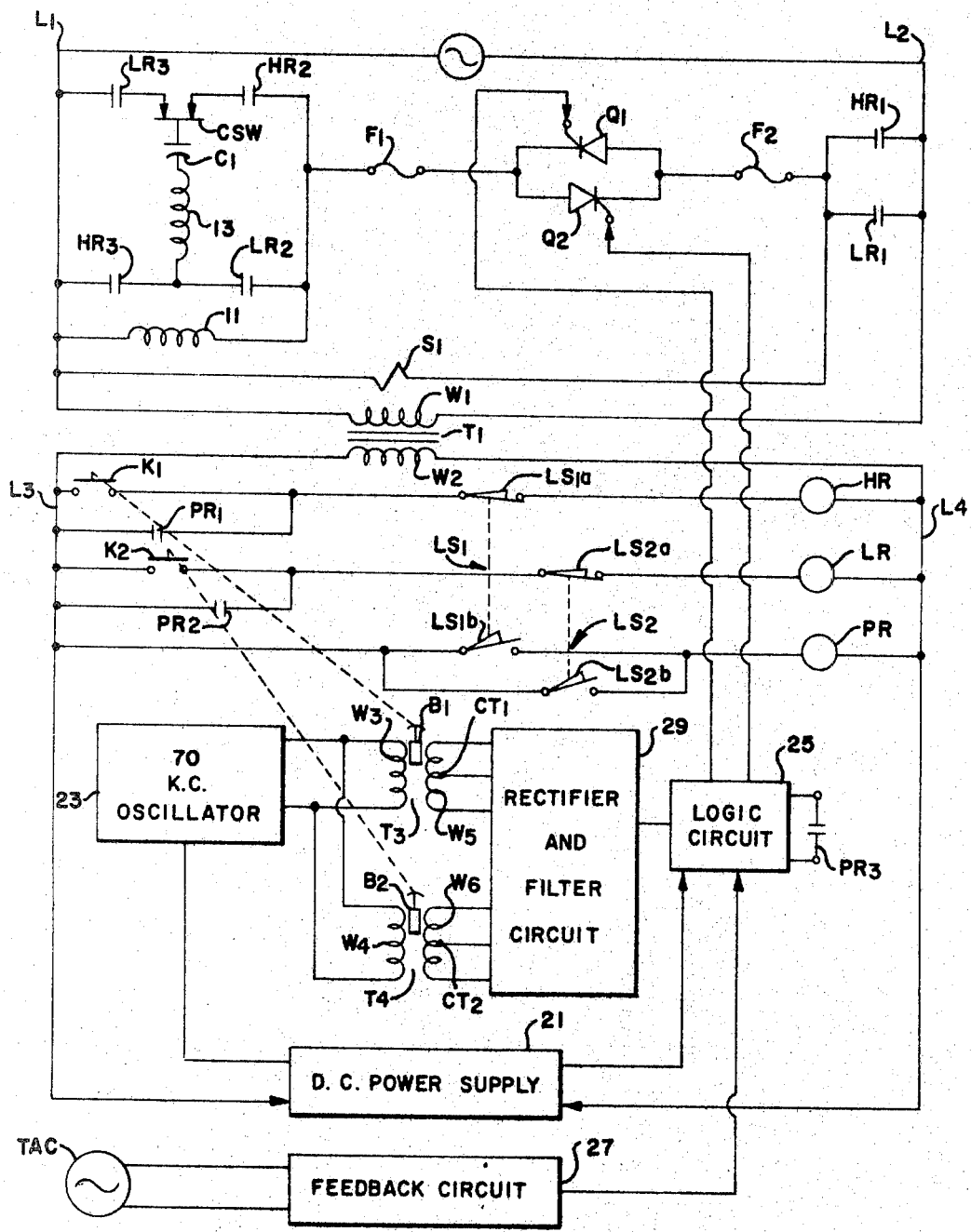

This is a division of co-pending application Ser. No. 555,410, now Patent No. 3,402,335, filed June 6, 1966, which is a continuation-in-part of co-pending application Ser. No. 525,236, filed Feb. 4, 1966.

This invention relates to a control, and more particularly, to a control for varying the phrase of a triggering signal for a controlled rectifier such as a silicon controlled rectifier (SCR) or a thyratron, thereby determining the portion of a cycle of A.C. supply voltage during which said rectifier will conduct.

Among the several objects of the present invention is to provide an improved control which includes solid state components such as transistors.

Another object of the invention is to provide a control for varying the duration of the period of conduction of a controlled rectifier during a cycle of A.C. voltage.

Other objects of the invention are to provide a control which is relatively inexpensive, easily and inexpensively maintained and which exhibits a high degree of reliability during operation.

Other objects and features will be in part apparent and in part pointed out hereinafter.

Briefly, the control of the present invention employs a transistor for controlling the charging rate of a capacitor. A variable amplitude input signal is applied to the base or control electrode of said transistor for controlling its conduction.

The capacitor is discharged periodically or at a predetermined time by means of a bistable transistorized switching device. A second bistable switching device provides an output signal when the charge on said capacitor reaches a predetermined level. The pulses generated by said second bistable switching device are coupled to a one-shot or monostagle multivibrator.

The one-shot or monostable multivibrator generates triggering pulses or signals of a predetermined or uniform duration in response to the pulses generated by said second switching device. The triggering or signal pulses of said one-shot or monostable multivibrator may be fed into the primary side of a pulse transformer for firing either an SCR, a thyratron or other similar devices at various phases of a cycle of an A.C. supply voltage.

The control of the present invention is a sub-combination of the hoist control circuit disclosed in application Ser. No. 555,410 referred to above.

Briefly, the hoist disclosed in application Ser. No. 555,-410 employs a reversible A.C. induction motor for providing driving force for lifting and lowering a load. A.C. power is supplied to the motor through a circuit which includes at least one SCR for varying the average A.C. power applied to the motor in response to variations in the phase of triggering of the SCR relative to the applied A.C. power.

A manually operable pushbutton controller is provided for controlling the speed of the motor. The pushbutton operates means for providing a D.C. reference signal, the amplitude of which varies as a function of the travel of the pushbutton to represent a desired speed of the motor. The motor drives a tachometer or other means for providing a feedback signal, the amplitude of which varies as a function of the actual speed of the motor. The phase of triggering of the SCR is varied as a function of the relative amplitudes of the feedback signal and the reference signal whereby the power supplied to the motor is varied to maintain the actual speed of the motor substantially equal to the desired speed under varying hoist load conditions.

The invention accordingly comprises the constructions hereinafter described, the scope of the invention being indicated in the following claims.

Figure 2:
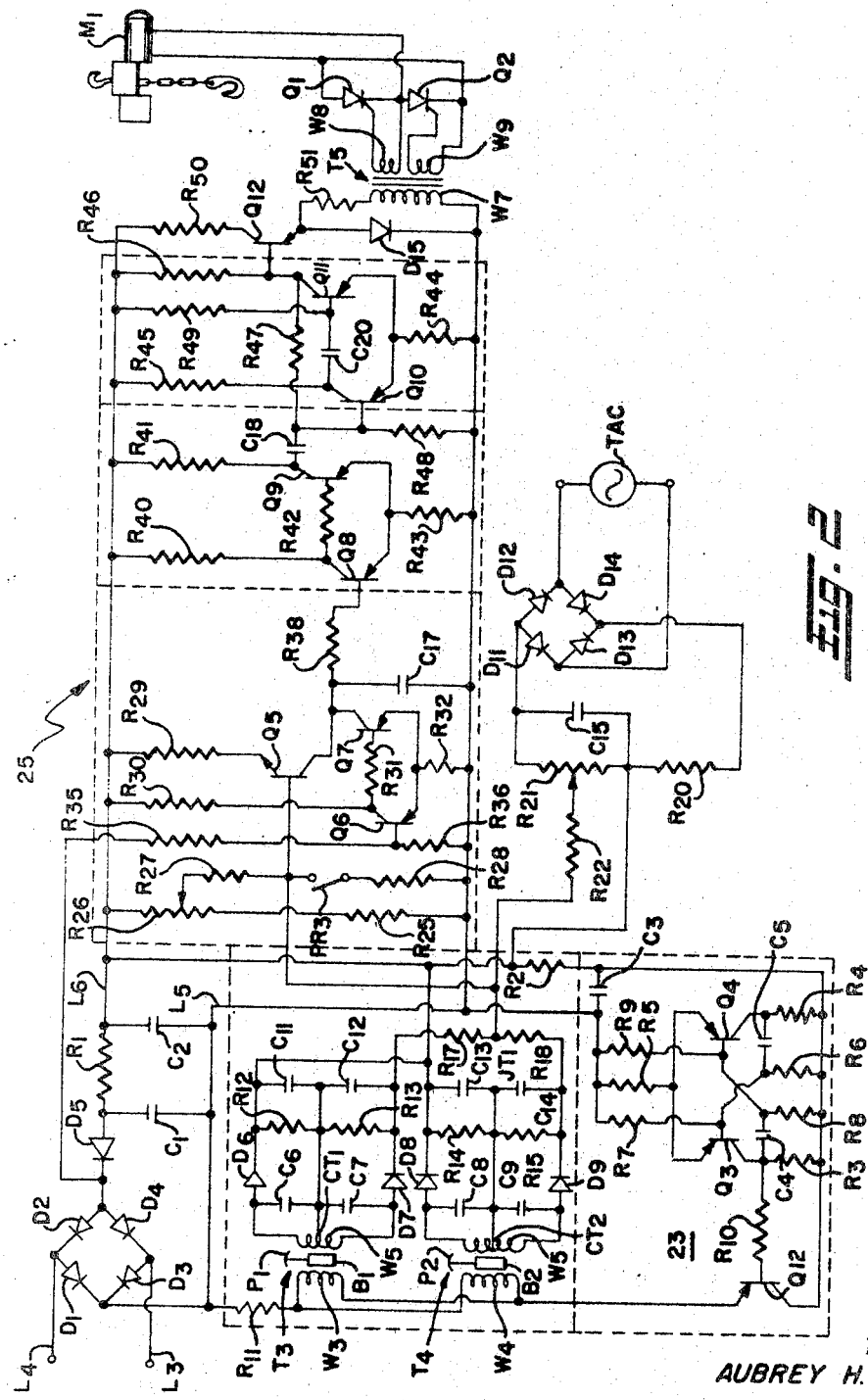

In the accompanying drawings, in which one of various possible embodiments of the invention is illustrated, FIG. 1 is a wiring diagram of an electric hoist; and
FIG. 2 is a schematic circuit diagram of an electronic speed control of this invention.

Corresponding reference characters indicate corresponding parts throughout the several views of the drawings.

Referring now to FIG. 1 the wiring there illustrated is employed to control the operation of an electric hoist, the mechanical portions of which are essentially conventional (see FIG. 2) and are not illustrated in detail herein. The hoist employs a conventional single phase, squirrel-cage A.C. induction motor M1 having a run winding 11 and a start winding 13. Start winding 13 is connected in series with a conventional starting capacitor C1 and a centrifugal starting switch CSW. The hoist is also provided with a brake which is controlled by a solenoid S1, the brake being released in conventional manner when the solenoid is energized.

A.C. power for the hoist is obtained through a pair of leads L1 and L2. A.C. power is selectively supplied from lines L1 and L2 to the brake solenoid S1 and to the induction motor by circuits which include a plurality of normally open contacts HR1, HR2 and HR3 which are closed by the energization of a hoisting relay winding HR as described in greater detail hereinafter and also a plurality of normally open relay contacts LR1, LR2 and LR3 which are closed by the energization of a lowering relay winding LR as is also described in greater detail hereinafter. The circuit to the motor windings also includes a pair of fuses F1 and F2 and a pair of SCR's (silicon controlled rectifiers) Q1 and Q2 which are connected in parallel and are oppositely oriented as illustrated. As will be understood by those skilled in the art, SCR's Q1 and Q2 will supply A.C. power to motor M1 when appropriately triggered, the amount of power being passed being a function of the phase of triggering relative to the phase of the applied A.C.

By closing the contacts HR1, HR2 and HR3, A.C. power may thus be passed to rotate the motor in one direction while closing contacts LR1, LR2 and LR3 will pass A.C. power to the windings to rotate the motor in the opposite direction. Solenoid S1 is energized to release the motor brake when either set of contacts is closed.

The primary winding W1 of a step-down transformer T1 is also connected across lines L1 and L2. Transformer T1 includes a secondary winding W2 which provides A.C. power to a pair of leads L3 and L4 at a relatively low voltage level suitable for powering semiconductor or transistor circuits. Relay winding HR is connected across lines L3 and L4 by a circuit which includes a set of manually operable contacts K1 and a set of normally closed contacts LS1a of an upper limit switch LS1. Contacts K1 are shunted by a pair of normally open relay contacts PR1 which are closed by the energization of a plugging relay winding PR as is described in greater detail hereinafter.

Relay winding LR is connected across lines L3 and L4 by a circuit which includes a second set of manually operable contacts K2 and a set of normally closed contacts LS2a of a lower limit switch LS2. Contacts K2 are shunted by a pair of normally open relay contacts PR2 which are also closed upon energization of plugging relay winding PR. Contacts K1 and K2 are operable by respective pushbuttons P1 and P2 which, as described hereinafter, are also employed in varying the speed of motor M1. Plugging relay winding PR is connected across lines L3 and L4 by a circuit which includes two sets of normally open contacts (LS1b and LS2b) connected in parallel. Contacts LS1b and LS2b are operated by upper limit switch LS1 and lower limit switch LS2 respectively. Winding PR also operates a pair of normally open contacts PR3 as described hereinafter.

A.C. power supplied from lines L3 and L4 also energizes a D.C. power supply indicated at 21 in FIG. 1. Supply 21 supplies D.C. to an oscillator 23 and to a logic circuit 25. As is described in greater detail hereinafter, oscillator 23 is employed in generating a reference signal which is representative of a desired speed of the hoist motor. Oscillator 23 generates a high frequency A.C. signal which is applied to the primary windings W3 and W4 of a pair of discriminator transformers T3 and T4. Each of the transformers T3 and T4 includes a secondary winding, W5 and W6 respectively, having a respective center tap, CT1 and CT2, dividing the secondary winding into upper and lower winding sections as viewed in FIGS. 1 and 2. Each of the discriminator transformers T3 and T4 also includes a movable slug or core B1 and B2 which is movable within the windings for varying the coupling between the respective primary and the various portions of the respective secondary winding.

Each of the slugs B1 and B2 is mechanically connected to a respective one of the pushbuttons P1 and P2 which control contacts K1 and K2. The pushbutton controls are constructed so that, in depressing the button, the first portion of travel, for example the first ⅛ inch, closes the respective contacts K1 and further travel produces substantial movement of the respective slug within the windings while the contacts remain closed. A preferred form of manually operable controller suitable for this use is disclosed in the aforesaid copending application, Ser. No. 525,236.

The signals generated in the secondary windings W5 and W6 are rectified and filtered in a circuit indicated at 27 to provide to logic circuit 25 a D.C. reference signal the amplitude of which varies as a function of the operation of the respective pushbuttons P1 and P2.

An A.C. tachometer TAC is mounted on the shaft of motor M1 to provide an A.C. signal the amplitude of which varies as a function of the actual speed of the motor. This A.C. signal is rectified and filtered in a circuit indicated at 29 in FIG. 1 to provide a D.C. feedback signal to logic circuit 25. As is described in greater detail hereinafter, logic circuit 25 operates to vary the phase of triggering signals supplied to SCR's Q1 and Q2 as a function of the relative levels of the D.C. reference and feedback signals applied thereto to maintain the speed of motor M1 substantially equal to the preselected level represented by the reference signal.

Referring now to FIG. 2 wherein certain of the electronic components employed in the system of FIG. 1 are illustrated in greater detail, the D.C. power supply 21 includes a full-wave bridge rectifier constituted by diodes D1–D4. A.C. power is supplied to the bridge through lines L3 and L4 and the pulsating D.C. provided by the bridge is smoothed by a filter including capacitors C1 and C2 and a resistor R1 to provide a uniform supply of D.C. across a pair of leads L5 and L6. The full-wave pulsating D.C. provided by the rectifier bridge is isolated from the filtered D.C. by a diode D5 to provide a source of pulsating voltage at twice the supply frequency for purposes described in greater detail hereinafter.

D.C. from lines L5 and L6, additionally filtered by a resistor R2 and a capacitor C3, powers the oscillator 23. As illustrated, oscillator 23 is constituted by an astable multivibrator employing a pair of PNP transistors Q3 and Q4. Transistors Q3 and Q4 are provided with respective collector load resistors R3 and R4. The emitters of these transistors are connected together and share a common load resistor R5 which provides some cross coupling between the transistors. Transistor Q3 is forward biased by a network including resistors R6 and R7 and transistor Q4 is forward biased by a network including resistors R8 and R9. A.C. cross coupling between the transistors is provided by a capacitor C4 connecting the collector of transistor Q3 to the base of transistor Q4 and a capacitor C5 connecting the collector of transistor Q4 to the base of transistor Q3. As is understood by those skilled in the art, this multivibrator circuit will oscillate freely with the transistors Q3 and Q4 conducting alternately to provide a substantially square wave output signal at the collector terminal of either of the transistors. The circuit parameters of oscillator 23 are chosen so that it oscillates at a relatively high frequency with regard to line frequency, for example, the oscillator may produce a signal at 70 kilocycles per second.

An output signal is taken from the collector of transistor Q3 through a current limiting resistor R10 and is applied, through a PNP transistor Q12 connected as an emitter-follower, to one end of each of the transformer primary windings W3 and W4. The opposite end of each of the transformer primary windings W3 and W4 is connected to line L5 through a current limiting resistor R11.

The high frequency A.C. signal applied to each of the primary windings W3 and W4 is variably coupled to the upper and lower sections of the respective secondary winding, W5 and W6, to an extent which depends upon the position of the respective movable core B1 or B2. The different sections of the two windings W5 and W6 are substantially tuned to the oscillator frequency by respective capacitors C6–C9. The A.C. voltage provided by each secondary winding section with reference to the respective center tap CT1, CT2 is rectified by respective diode D6–D9 and the resultant D.C. is applied to charge a respective capacitor C11–C14. Each of the capacitors C11–C14 is shunted by a respective resistor R12–R15 to discharge the capacitor when the respective A.C. signal falls off in amplitude.

When each core is centrally positioned within the respective transformer windings the two sections of the secondary winding will provide A.C. voltages of equal magnitude and the respective capacitors are charged to equal D.C. voltages. The difference voltage between the ends of the two capacitors opposite their common connection to the respective center tap is then zero. As the transformer core is shifted from its central position, the A.C. output from the different sections of the secondary becomes unbalanced and a net difference voltage appears between the capacitors of a polarity which depends upon the direction of displacement of the transformer core. Each of the transformers T3 and T4, together with its associated rectifiers and filter components, thus constitutes a discriminator which responds to core position to provide a D.C.

voltage which varies from zero as the core is moved from its neutral position. The discriminator voltage is taken from the opposite ends of the respective filter capacitors (C11 and C12, C13 and C14), the common connection between the capacitors to the respective secondary center tap being allowed to float in potential.

As noted previously, the positions of the cores B1 and B2 within their respective windings, may be controlled manually by the pushbuttons P1 and P2. The D.C. output voltage from each of the discriminators may thus be controlled manually and, as is described in greater detail hereinafter, this manually selectable D.C. voltage is employed as a reference signal, the amplitude of which represents a desired speed of the hoist motor. It should be noted that this D.C. reference voltage is adjustable by movement of the respective transformer core without the movement of any potentiometer or rheostat. Thus, the problems associated with the use of sliding potentiometer contacts are avoided, e.g., wear, electrical noise, etc.

The output of the discriminator controlled by pushbutton P1 represents speed in the upward or hoisting direction and that controlled by pushbutton P2 represents speed in the downward or lowering direction. However, as will be explained in greater detail hereinafter, the two discriminators do not operate to provide signals of opposite voltage for the opposite directions but rather provide signals of the same voltage to increase the power supplied to the motor, the reversing of the motor being accomplished by the contacts HR2, HR3, LR2 and LR3.

One side of each of the discriminators output signals is connected to supply line L6. The other side of each is applied to a mixing junction JT1 through a respective isolating resistor R17 or R18.

Motor M1 drives tachometer generator TAC which provides an A.C. signal which varies in amplitude as a function of the motor speed and which is preferably proportional thereto. The A.C. tachometer signal is rectified by a full-wave bridge constituted by diodes D11–D14 and is filtered by a capacitor C15 and a resistor R20 to provide a D.C. signal voltage which similarly varies as a function of the speed of motor M1. A preselected portion of the D.C. voltage is obtained by means of a potentiometer R21 and is applied, through an isolating resistor R22, to the mixing junction JT1. The D.C. signal obtained from the tachometer TAC is employed as a feedback signal and for this purpose is bucked against the reference signals provided by the transformers T3 and T4 and associated rectifier circuits, that is, the diodes D11–D14 are oriented so that the feedback signal is of polarity opposite to that of the reference signal with regard to the potential existing at line L6. The resultant voltage appearing at junction JT1 is thus a mixture or composite of the several voltages applied to this junction through the several isolating resistors. This composite voltage is, an effect, an error signal which represents the difference between the actual speed of the motor M1 and the desired speed as represented by the reference signal obtained by the operation of one of the pushbuttons P1 or P2.

Logic circuit 25 operates to trigger the SCR's Q1 and Q2 in timed relation to the frequency of the applied A.C. power, the phase of triggering being varied as a function of the error signal. The error signal from junction JT1 is applied to the base of an NPN transistor Q5. The base of transistor Q5 is also biased by a voltage obtained by a voltage divider including a resistor R25 and a potentiometer R26 connected across lines L6 and L5 the voltage being applied to the current limiting resistor R27. Additional bias can also be applied from line L5 through a resistor R28 by the closing of a pair of relay contacts PR3 which are operated by the relay winding PR shown in FIG. 1 for the purpose described hereinafter. The emitter of transistor Q5 is connected to supply lead L6 through a resistor R29.

At any given error signal level, transistor Q5 functions as a high impedance or substantially constant current source for charging a capacitor C17. Capacitor C17 therefore charges substantially linearly with time. Capacitor C17 is also discharged periodically or at a predetermined time in synchronism with the applied A.C. power by a bistable switching circuit such as a Schmitt trigger circuit comprising a pair of PNP transistors Q6 and Q7. Transistor Q6 is provided with a collector load resistor R30 and the collector of transistor Q7 is connected between the collector of transistor Q5 and capacitor C17. The collector of transistor Q6 is connected to the base of transistor Q7 by a resistor R31 to provide coupling between the two transistors and the emitters of the two transistors are connected together and to line L5 through a common resistor R32, which provides the regenerative feedback which gives the Schmitt trigger circuit its typical two-state characteristics.

The Schmitt circuit is triggered in synchronism with the applied A.C. power by a signal obtained from power supply 21 through a voltage divider constituted by resistors R35 and R36. As the diodes D1–D4 constitutes a full-wave bridge and the filtered D.C. is blocked by diode D5, the voltage impressed across resistors R35 and R36 pulsates at twice the supply frequency, that is, there is a pulsation for each half cycle of the applied A.C. The triggering voltage applied by resistors R35 and R36 to the Schmitt circuit thus trigger it during each A.C. half cycle to discharge capacitor C17. As capacitor C17 is substantially linearly charged and is discharged periodically or at a predetermined time, it can be seen that the voltage appearing on capacitor C17 varies substantially according to a sawtooth characteristic.

The voltage on capacitor C17 is applied through a current limiting resistor R38, to a second bistable switching circuit such as a Schmitt trigger circuit comprising a pair of PNP transistors Q8 and Q9. Each of the transistors Q8 and Q9 is provided with a respective load resistor R40 and R41 and coupling between the transistors is provided by a resistor R42 connecting the collector of transistor Q8 to the base of transistor Q9. Regenerative feedback for providing two-state switching operation is obtained by means of a resistor R43 commonly connecting the emitters of both of transistors Q8 and Q9 to the line L5. As is understood by those skilled in the art, this Schmitt trigger circuit switches abruptly from a state in which Q9 is conducting to a state in which transistor Q8 is conducting when the voltage or charge on capacitor C17 reaches a predetermined level.

When this Schmitt trigger circuit switches, a sharp pulse is coupled through a capacitor C18 to a one-shot or monostable multivibrator comprising a pair of PNP transistors Q10 and Q11. Each of transistors Q10 and Q11 is provided with respective load resistor R45 and R46 and their emitters are commonly connected to line L6 through a resistor R44. Regenerative cross coupling for D.C. is provided by a network including a pair of resistors R47 and R48 connecting the collector of transistor Q11 to the base of transistor Q10. Cross coupling for A.C. is provided by a capacitor C20 connecting the collector of transistor Q10 to the base of transistor Q11. Transistor Q11 is normally biased into conduction by a resistor R49 connecting its base terminal to the line L6. As is understood by those skilled in the art, this one-shot or monostable multivibrator circuit normally remains in a stable state in which transistor Q11 is conducting and transistor Q10 is cut off. However, when the circuit is triggered, the pulse coupled from the collector of transistor Q10 to the base of transistor Q11 by capacitor 20 will cut off transistor Q11 so that the circuit switches to a state in which transistor Q10 is conducting and transistor Q11 is cut off. This state lasts for a preselected or predetermined interval until capacitor C20 is discharged by current flowing through resistor R49.

When the one-shot or monostable multivibrator is triggered by a pulse coupled from the Schmitt trigger circuit through the capacitors C18, it will generate a strong pulse of predetermined or uniform duration at the collector of Q10. This pulse is applied, through a transistor Q12 connected as an emitter-follower, to the primary winding W7 of a pulse transformer T5. A current limiting resistor R50 is provided in the collector lead of transistor Q12 and a resistor R51 is connected in series with winding W7. Winding W7, together with resistor R51, is shunted by a diode D15 which is oriented for suppressing the inductive kick of winding W7 when the pulse generated by the one-shot or monostable multivibrator is over and the supply of current to the winding is cut off.

Pulse transformer T5 includes a pair of secondary windings W8 and W9, each of which is connected across the gate cathode of a respective one of the SCR's Q1 and Q2. The pulses coupled to the gates of the SCR's when the one-shot or monostable multivibrator is triggered are operative to trigger into conduction that SCR which is then forward biased by the applied A.C. power. As noted previously the SCR's are connected in parallel and face in opposite directions so that they are alternately forward biased upon successive half cycles of the applied A.C. wave form.

The operation of this apparatus is as follows, it being assumed that it is desired to raise the load. To cause the load to rise the pushbutton P1 is depressed. The first part of the movement of button P1 causes the contacts K1 to be closed as described previously. The closing of contacts K1 completes an energizing circuit through the hoist relay winding HR and the energization of this winding closes the contacts HR1, HR2 and HR3. The motor M1 is thus connected across lines L1 and L2 with the start winding 13 being connected to produce forward rotation of the motor, that is, the direction of rotation which will produce raising of the load. The motor M1 is energized to an extent determined by the phase of triggering of the SCR's Q1. Solenoid S1 is simultaneously energized to release the motor brake.

The phase of triggering of SCR's Q1 and Q2 is controlled by the circuit of FIG. 2 in the following manner. When the button P1 is depressed the transformer core B1 is displaced from its neutral or rest position so that unbalanced signals are produced by the upper and lower sections of the secondary winding W5 with reference to the center tap CT1. This unbalance in the A.C. signals provided to the rectifier circuitry causes a D.C. voltage to be applied to junction JT1 through resistor R17 as explained previously. Assuming that the motor M1 is not yet rotating, no feedback signal is derived from the tachometer and the voltage at JT1 reflects only the desired speed. The voltage at junction JT1 therefore forward biases transistor Q5 causing capacitor C17 to charge at a rate determined by or as a function of the amplitude of the reference signal.

Within each A.C. half cycle the capacitor C17 charges to the tripping point of the Schmitt trigger comprising transistor Q8 and Q9, reaching that triggering point at a time or phase which is determined by the amplitude of the signal applied to the base of transistor Q5. As described previously, when the triggering point is reached the Schmitt trigger trips and triggers the one-shot or monostable multivibrator circuit comprising transistors Q10 and Q11 into delivering a triggering pulse to the SCR's Q1 and Q2. Since the average A.C. power transmitted by the SCR's Q1 and Q2 to motor M1 depends upon the time or phase of triggering, it can be seen that the power supplied to the motor will also be varied as a function of the amplitude of the signal applied to the base of transistor Q5.

The power transmitted by the SCR's Q1 and Q2 causes the motor M1 to operate and as its speed increases a feedback signal is generated by the tachometer TAC and its associated circuitry. This feedback signal is bucked against the reference signal thereby reducing the driving signal applied to the base of transistor Q5. In this way, a feedback or servo control of speed is obtained which cause the power transmitted to motor M1 to be varied to maintain the speed of the hoist substantially equal to the desired speed despite variations in load. Motor M1 can then be controlled in speed by operating the pushbutton P1 to position the core B1 within the winding W3 and W5 thereby varying the reference signal. If the speed of motor M1 reaches that at which the centrifugal switch CSW operates, the start winding is taken out of the circuit in conventional manner. Since this speed control employs feedback to obtain a steady preselected speed in spite of load variations, the characteristics of motor M1 and centrifugal CSW must be chosen so that there is no increase in torque when the centrifugal switch opens. Otherwise there may be instability of operation around that speed due to the negative load characteristics that the switching may introduce.

The operation when the hoist is being operated to lower a load is essentially similar to that above described except that the pushbotton contacts K2 are closed instead of the contacts K1. Thus the lowering relay LR is energized to close contacts LR1–LR3 thereby causing the motor M1 to rotate in reverse direction to cause the hoist to lower. The operation of the speed control circuitry of FIG. 2 is essentially identical except that the reference signal is then derived from the transformer T4 rather than the transformer T3.

The system illustrated is also provided with certain protective interlocks which prevent damage to the hoist by limiting the travel of the load. The limit switch LS1 is positioned so as to be operated when the load reaches the upper end of its desired range of travel. Switch LS1 is constructed so that the contacts LS1a open before the contacts LS1b close. When the switch is operated the opening of contacts LS1a removes power from the hoisting relay and the closing of contacts LS1b apply power to the plugging relay PR. The energization of plugging relay in turn energizes the lowering relay winding LR through the contacts PR2 even though the pushbutton contacts K2 are open, thereby causing the hoist to reverse directions. The simultaneous closure of contacts PR3 (FIG. 2) strongly biases the transistor Q5 into conduction so that capacitor C17 is rapidly charged and the SCR's Q1 and Q2 are triggered at an early point in each half cycle so that the reversing operation occurs at full power. The limit switch LS2 operates in an essentially similar manner to prevent the hoist from over-running the lower end of its desired range of travel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for varying the phase of a triggering signal for a controlled rectifier thereby determining the portion of a cycle of A.C. supply voltage during which said rectifier will conduct, said control comprising:
   a capacitor;
   means responsive to a variable amplitude input signal, said response means connected to said capacitor for charging said capacitor at a rate which varies as a function of the amplitude of said input signal;
   a bistable switching circuit responsive to said A.C. supply voltage for discharging said capacitor at a predetermined time within said cycle; said
   means connected to said capacitor for generating said triggering signal when the charge on said capacitor reaches a predetermined level whereby the time within said A.C. supply voltage cycle at which said triggering signal is generated is a function of the amplitude of said input signal.

2. A control as set forth in claim 1 wherein said means for charging said capacitor includes a transistor.

3. A control as set forth in claim 1 wherein said means for generating said triggering signal includes a second bistable switching circuit.

4. A control as set forth in claim 3 wherein said means for generating said triggering signal further includes a monostable multivibrator.

5. A control as set forth in claim 1 wherein said bistable switching circuit includes a Schmitt trigger circuit.

6. A control for varying the phase of a triggering signal for a controlled rectifier thereby determining the portion of a cycle of A.C. supply voltage during which said rectifier will conduct, said control comprising:
   a capacitor;
   means responsive to a variable amplitude input signal, said response means connected to said capacitor for charging said capacitor at a rate which varies as a function of the amplitude of said input signal;
   a bistable switching circuit responsive to said A.C. supply voltage for discharging said capacitor at a predetermined time within said cycle;
   means connected to said capacitor for generating an output signal when the charge on said capacitor exceeds a predetermined level;
   and a monostable multivibrator connected to said output signal generating means,
   said multivibrator responsive to said output signal for generating a triggering signal of uniform duration when said output signal is provided whereby the time within said A.C. supply voltage cycle at which said triggering signal is generated is a function of the amplitude of said input signal.

7. A control as set forth in claim 6 wherein said means for charging said capacitor includes a transistor.

8. A control for varying the phase of a triggering signal for a controlled rectifier thereby determining the portion of a cycle of A.C. supply voltage during which said rectifier will conduct, said control comprising:
   a capacitor;
   means responsive to a variable amplitude input signal comprising a transistor;
   said response means connected to said capacitor for charging said capacitor at a rate which varies as a function of the amplitude of said input signal;
   a first bistable switching circuit responsive to said A.C. supply voltage for discharging said capacitor at a predetermined time within said cycle;
   means including a second bistable switching circuit connected to said capacitor for providing an output signal when the charge on said capacitor exceeds a predetermined level;
   and a monostable multivibrator connected to said second bistable switching circuit,
   said monostable multivibrator responsive to said output signal for generating a triggering signal of uniform duration when said output signal is provided whereby the time within said A.C. supply voltage cycle at which said triggering signal is generated is a function of the amplitude of said input signal.

9. A control as set forth in claim 8 wherein said first and second bistable switching circuits include Schmitt trigger circuits.

References Cited

UNITED STATES PATENTS

| | | | |
|---|---|---|---|
| 2,977,523 | 3/1961 | Cockrell | 307—252 XR |
| 3,304,438 | 2/1967 | Muskovac | 307—252 XR |
| 3,308,307 | 3/1967 | Moritz | 307—290 XR |
| 3,309,602 | 3/1967 | Euvino et al. | 307—252 XR |
| 3,371,231 | 2/1968 | Burley | 307—252 XR |
| 3,373,296 | 3/1968 | Pinckaers | 307—247 |

JOHN S. HEYMAN, Primary Examiner

STANLEY D. MILLER, Assistant Examiner

U.S. Cl. X.R.

307—246, 262, 264, 290; 323—22

UNITED STATES PATENT OFFICE
CERTIFICATE OF CORRECTION

Patent No. 3,488,521      Dated January 6, 1970

Inventor(s) Aubrey H. Smith

It is certified that error appears in the above-identified patent and that said Letters Patent are hereby corrected as shown below:

Col. 1 - line 39 - The word "phrase" should read "phase"; line 66 - the word "monostagle" should read "monostable".
Col. 5 - line 55 - The word "an" should read "in".
Col. 7 - line 2 - The word --transistor-- was omitted after the word "of"; line 39 - the word "circuit" should read "circuitry"; line 75 - the word "cause" should read "causes".
Col. 8 - line 5 - The word "winding" should read "windings"; line 15 - the word "characteristics" should read "characteristic"; line 69 - the word "said" should read "and".

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents